Patented Oct. 27, 1925.

1,558,559

UNITED STATES PATENT OFFICE.

ALWIN MITTASCH, OF LUDWIGSHAFEN-ON-THE-RHINE, MATHIAS PIER, OF HEIDELBERG, AND KARL WINKLER, OF LUDWIGSHAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

PRODUCTION OF OXYGENATED ORGANIC COMPOUNDS.

No Drawing.   Application filed September 6, 1923.   Serial No. 661,321.

*To all whom it may concern:*

Be it known that we, ALWIN MITTASCH, MATHIAS PIER, and KARL WINKLER, citizens of the German Empire, residing the first and third at Ludwigshafen-on-the-Rhine and the second at Heidelberg, Germany, have invented new and useful Improvements in the Production of Oxygenated Organic Compounds, of which the following is a specification.

By the reduction of carbon monoxid or dioxid with hydrogen at an elevated temperature and pressure methanol or other oxygenated organic compounds can be produced, provided proper catalysts are used.

According to the present invention the aforementioned process can be carried out with particular advantage by using contact masses containing mixtures of such oxids of metals of different groups of the periodic system as are not reduced to the metals under the conditions of working and with a preponderating quantity of the more basic oxid. Non-reducible oxids of the second to the seventh group of the periodic system are especially suitable for such mixed catalysts.

As an example we mention the combination of zinc oxid and chromium oxid with the zinc oxid preponderating; from two to twelve or more mol. weights of zinc oxid may be present for each one molecular weight of chromium oxid. Other suitable combinations according to the invention are the oxids of zinc and uranium, zinc and vanadium, zinc and tungsten, magnesium and molybdenum, cerium and manganese but many others may be combined, with the more basic in a preponderating amount in either case. Other substances, for example metals, may be present, besides.

The mixed contact masses of the character described may be prepared by intimately mixing the constituents, or by simultaneously precipitating them from solutions of proper salts, or by melting suitable salts together, or in any other suitable way. Supports may also be employed.

It is advisable to keep the contact masses free from iron and nickel, or to allow only comparatively small amounts thereof to be contained therein, to keep also the gas mixture serving for the reaction free from volatile iron and nickel compounds and to make the apparatus to avoid a contamination of the contact mass by iron, making it from copper, for example, or lining it inside with copper.

The contact masses may be employed at temperatures between about 200 degrees and 600 degrees centigrade, the pressure ranging preferably above 50 atmospheres without putting an upper limit to the pressure. After separating the products formed, which may consist of either practically pure methanol, or of a mixture of methanol with more or less of oxygenated organic substances of an oily nature, insoluble in water, the residual gases may be again subjected to the catalytic treatment, after adding the gases consumed by the reaction. The mixture of carbon monoxid or dioxid, or both, and hydrogen, which latter preferably should exceed, by volume, the former, may also contain gaseous hydrocarbons, nitrogen or other gases.

Now what we claim is:—

1. The manufacture of methanol or other oxygenated organic compounds, which consists in passing a mixture of carbon oxids with at least about an equal volume of hydrogen at a temperature of between about 200 and 600 degrees centigrade and pressure of about 50 atmospheres or higher over a contact mass containing in an intimate mixture at least two oxids, non-reducible to the metals under the conditions of working, of metals belonging to different groups of the periodic system, with the more basic oxid in preponderating quantity but substantially in the absence of iron and nickel.

2. The manufacture of methanol or other oxygenated organic compounds, which consists in passing a mixture of carbon oxids with at least about an equal volume of hydrogen at a temperature of between about 200 and 600 degrees centigrade and pressure of about 50 atmospheres or higher over a contact mass containing in an intimate mixture at least two oxids, non-reducible to the metals under the conditions of working, of metals belonging to different groups of the periodic system but to the second to the seventh group thereof, with the more basic oxid in preponderating quantity but substantially in the absence of iron and nickel.

3. The manufacture of methanol or other oxygenated organic compounds, which consists in passing a mixture of carbon oxids with at least about an equal volume of hydrogen at a temperature of between about 200 and 600 degrees centigrade and pressure of about 50 atmospheres and upwards over a contact mass containing in an intimate mixture at least two oxids, non-reducible to the metals under the conditions of working, of metals belonging to different groups of the periodic system, with the more basic oxid in preponderating quantity and, besides, containing a metal, but substantially free from iron and nickel.

4. The manufacture of methanol or other oxygenated organic compounds, which consists in passing a mixture of carbon oxids with a least about an equal volume of hydrogen at a temperature between about 200 and 600 degrees centigrade and pressure of about 50 atmospheres or more and while excluding volatile iron and nickel compounds over a contact mass containing in an intimate mixture at least two oxids, non-reducible to the metals under the conditions of working, of metals belonging to different groups of the periodic system, with the more basic oxid in preponderating quantity but substantially in the absence of iron and nickel.

5. The manufacture of methanol or other oxygenated organic compounds, which consists in passing a mixture of carbon oxids with at least about an equal volume of hydrogen at a temperature between about 200 and 600 degrees centigrade and pressure of about 50 atmospheres or more and while excluding volatile iron and nickel compounds over a contact mass containing in an intimate mixture at least two oxids, non-reducible to the metals under the conditions of working, of metals belonging to different groups of the periodic system, with the more basic oxid in preponderating quantity, but substantially free from iron and nickel.

6. The manufacture of methanol or other oxygenated organic compounds, which consists in passing a mixture of carbon oxids, substantially carbon monoxid, and at least an equal volume of hydrogen at a temperature of between 200 and 600 degrees centigrade and pressure of about 50 atmospheres or more and while excluding volatile iron and nickel compounds over a contact mass containing the oxids of zinc and chromium with the zinc oxid in preponderating quantity and both oxids in a state of intimate mixture and substantially free from iron and nickel.

7. The manufacture of methanol or other oxygenated organic compounds, which consists in passing a mixture of carbon oxids with at least about an equal volume of hydrogen at a temperature between about 200 and 600 degrees centigrade and pressure of about 50 atmospheres or more and while excluding volatile iron and nickel compounds over a contact mass containing in an intimate mixture at least two oxids, non-reducible to the metals under the conditions of working, of metals belonging to different groups of the periodic system, with the more basic oxid in preponderating quantity, but substantially free from iron and nickel and separating the products from the gases after the catalytic treatment by cooling without releasing the pressure.

8. The manufacture of methanol or other oxygenated organic compounds, which consists in passing a mixture of carbon oxids, substantially carbon monoxid, and at least an equal volume of hydrogen at a temperature between about 200 and 600 degrees centigrade and pressure of about 50 atmospheres or more and while excluding volatile iron and nickel compounds over a contact mass containing the oxids of zinc and chromium with the zinc oxid in preponderating quantity and both oxids in a state of intimate mixture and substantially free from iron and nickel and separating the products from the gases after the catalytic treatment by cooling without releasing the pressure.

9. The manufacture of methanol or other oxygenated organic compounds, which consists in passing a mixture of carbon oxids, with at least about an equal volume of hydrogen at a temperature between about 200 and 600 degrees centigrade and pressure of about 50 atmospheres or more and while excluding volatile iron and nickel compounds over a contact mass containing in an intimate mixture at least two oxids, non-reducible to the metals under the conditions of working, of metals belonging to different groups of the periodic system, with the more basic oxid in preponderating quantity, but substantially free from iron and nickel and separating the products from the gases after the catalytic treatment by cooling without releasing the pressure and conveying the residual gas again over a contact mass of the character described.

10. The manufacture of methanol or other oxygenated organic compounds, which consists in passing a mixture of carbon oxids, substantially carbon monoxid, and at least an equal volume of hydrogen at a temperature between about 200 and 600 degrees centigrade and pressure of about 50 atmospheres or more and while excluding volatile iron and nickel compounds over a contact mass containing the oxids of zinc and chromium with the zinc oxid in prepondrating quantity and both oxids in a state of intimate mixture and substantially free from iron and nickel, and separating the products from the gases after the catalytic treatment by cooling without releasing the pressure and conveying the residual gas again over a contact mass of the character described.

In testimony whereof we have hereunto set our hands.

ALWIN MITTASCH.
MATHIAS PIER.
KARL WINKLER.